(12) United States Patent
Lee (10) Patent No.: US 7,867,020 B2
(45) Date of Patent: Jan. 11, 2011

(54) FIXTURE

(75) Inventor: Chia-En Lee, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/604,914

(22) Filed: Oct. 23, 2009

(65) Prior Publication Data

US 2010/0291781 A1 Nov. 18, 2010

(30) Foreign Application Priority Data

May 12, 2009 (CN) .......................... 2009 1 0302253

(51) Int. Cl.
*H01R 3/00* (2006.01)
(52) U.S. Cl. ............................. 439/500; 439/13; 439/32
(58) Field of Classification Search .................. 439/13, 439/32, 500
See application file for complete search history.

(56) References Cited

U.S. PATENT DOCUMENTS

| 6,028,767 | A  | * | 2/2000 | Lan ........................ 361/679.43 |
| 6,712,642 | B2 | * | 3/2004 | Bluhm et al. ............... 439/500 |
| 6,712,643 | B2 | * | 3/2004 | Suzuki ........................ 439/500 |
| 7,722,136 | B2 | * | 5/2010 | Chen et al. ............... 312/223.2 |

* cited by examiner

*Primary Examiner*—James Harvey
(74) *Attorney, Agent, or Firm*—Steven M. Reiss (57) ABSTRACT

A fixture includes a base seat, a resist mechanism, a drive mechanism and an adjust mechanism. The resist mechanism is fixed to the base seat and includes a connector. The drive mechanism is fixed to the base seat. The adjust mechanism is fixed to the base seat and includes a connecting board. The connecting board has a power module attached thereto. The adjust mechanism can adjust the power module relative to the connector. The drive mechanism can drive the connector to move towards the power module.

20 Claims, 10 Drawing Sheets

FIXTURE

BACKGROUND

1. Technical Field

The present disclosure relates to a fixture, and particularly to a fixture configured for securing and supplying power to a portable electronic device.

2. Description of Related Art

Portable electronic devices (e.g., mobile phones) typically require variant hardware testings or software testings. A power module is used to provide electricity with low voltage to the portable electronic devices for the testings. However, the power module is usually manually connected to the portable electronic device. The connection can be easily terminated during testing. Thus, a fixture is expected to simultaneously fix and electrically connect the portable electronic device and the power module Therefore, there is room for improvement within the art.

BRIEF DESCRIPTION OF THE DRAWING

Many aspects of the new fixture can be better understood with reference to the following drawings. The components in the drawings are not necessarily drawn to scale, the emphasis instead being placed upon clearly illustrating the principles of the new fixture. Moreover, in the drawings, like reference numerals designate corresponding parts throughout the several views.

DETAILED DESCRIPTION

FIGS. 1-10 show an exemplary fixture 100 for securing and supplying power to a portable electronic device (e.g., mobile phone) during testing of the portable electronic device.

Figure 1:
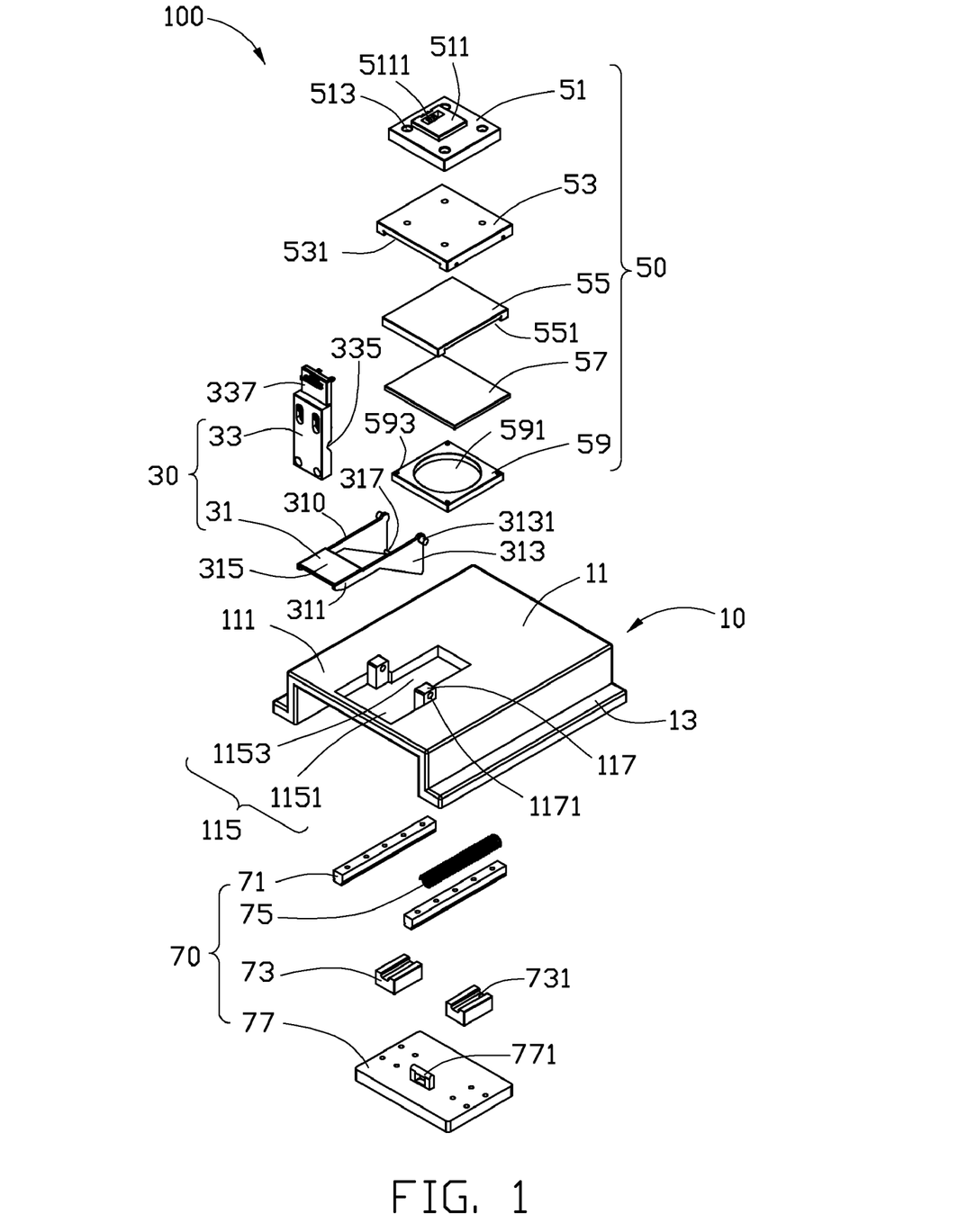
FIG. 1 is an exploded, isometric view of a fixture according to an exemplary embodiment, the fixture including an adjust mechanism.
Figure 2:
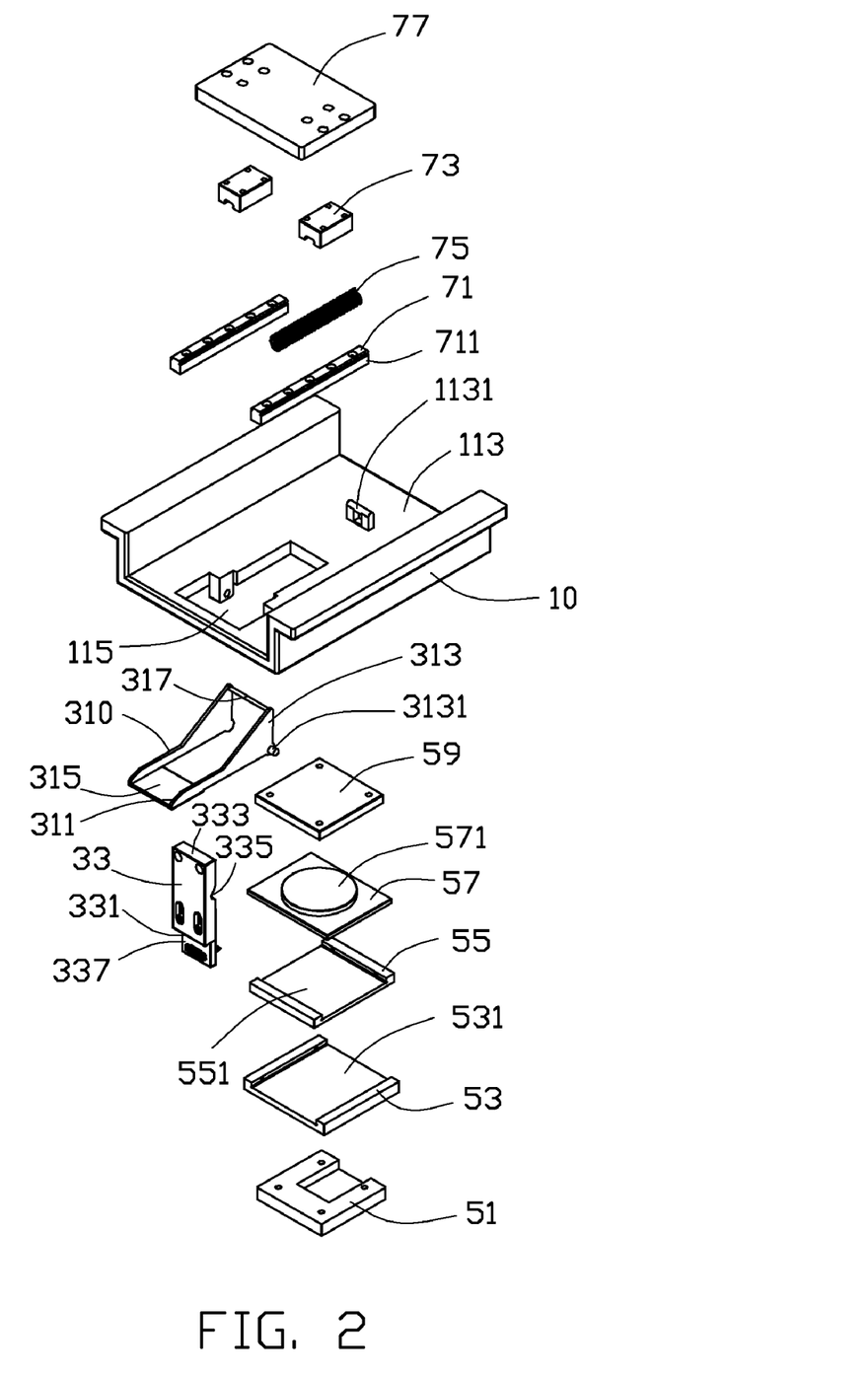
FIG. 2 is similar to FIG. 1, but viewed from another angle.

As shown FIGS. 1 and 2, the fixture 100 including a base seat 10, a resist mechanism 30, an adjust mechanism 50, and a drive mechanism 70. The resist mechanism 30 is mounted to the base seat 10 and electronically connected to a display device (not shown). The adjust mechanism 50 includes a power module 511 adjustable relative to the resist mechanism 30 in position. The power module 511 supplies power to the portable electronic device. The drive mechanism 70 drives the portable electronic device to resist against the resist mechanism 30.

The base seat 10 includes a base board 11 and two sideboards 13. The base board 11 includes a first surface 111 and a second surface 113 opposite to the first surface 111. The base board 11 defines a through opening 115. The through opening 115 includes a small front opening section 1151 and a large front opening section 1151. The front opening section 1151 communicates with the rear opening section 1153. The base board 11 further includes two opposite position blocks 117. The positioning blocks 117 extend from the interior surface of the front opening section 1151 and are located adjacent to the rear opening section 1153. The positioning blocks 117 are partially received in the front opening section 1151 and extend out of the front opening section 1151 above the first surface 111. The two position blocks 117 define two coaxial shaft holes 1171. The base board 11 has a mounting block 1131 protruding from the second surface 113.

The resist mechanism 30 includes a handle member 31 and a connecting member 33. The connecting member 33 defines a connector 337. The handle member 31 includes two sidewalls 310 parallel with each other. Each sidewall 310 includes a first end portion 311 and a second end portion 313 opposite to the first end portion 311. Each of the second end portions 313 has a shaft pin 3131 extending outwardly. The first end portions 311 connect with each other by an operate portion 315. The second end portions 313 connect with each other by a position bar 317. The connecting member 33 includes a connecting end portion 331 and a connecting end portion 333 opposite to the connecting end portion 331. The connector 337 is detachable mounted on the connecting end portion 331. The connecting end portion 333 is fixed to the drive mechanism 70. The connecting member 33 defines a position slot 335 for receiving the position bar 317.

Figure 3:
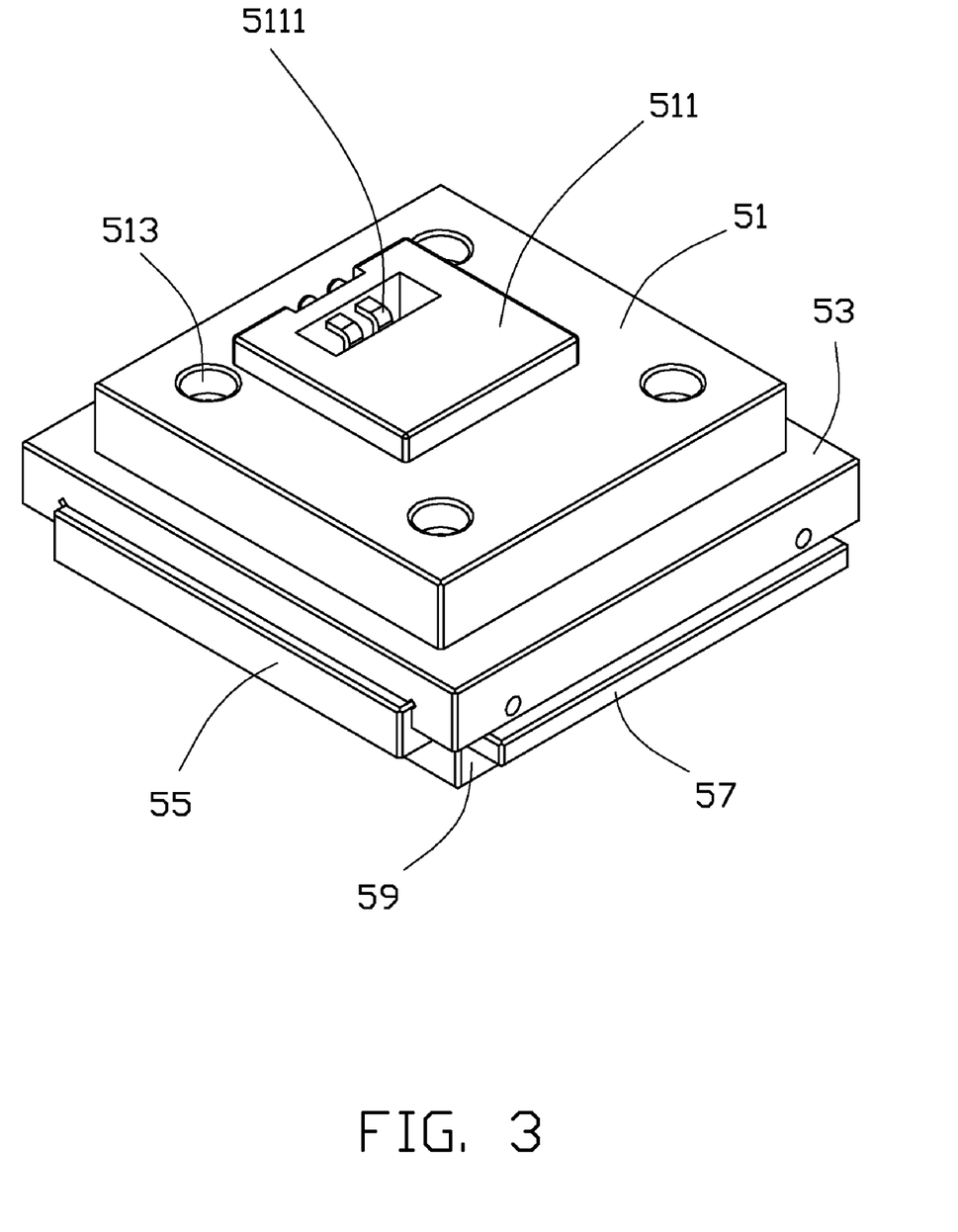
FIG. 3 is an assembled view of the adjust mechanism shown in FIG. 1.
Figure 4:
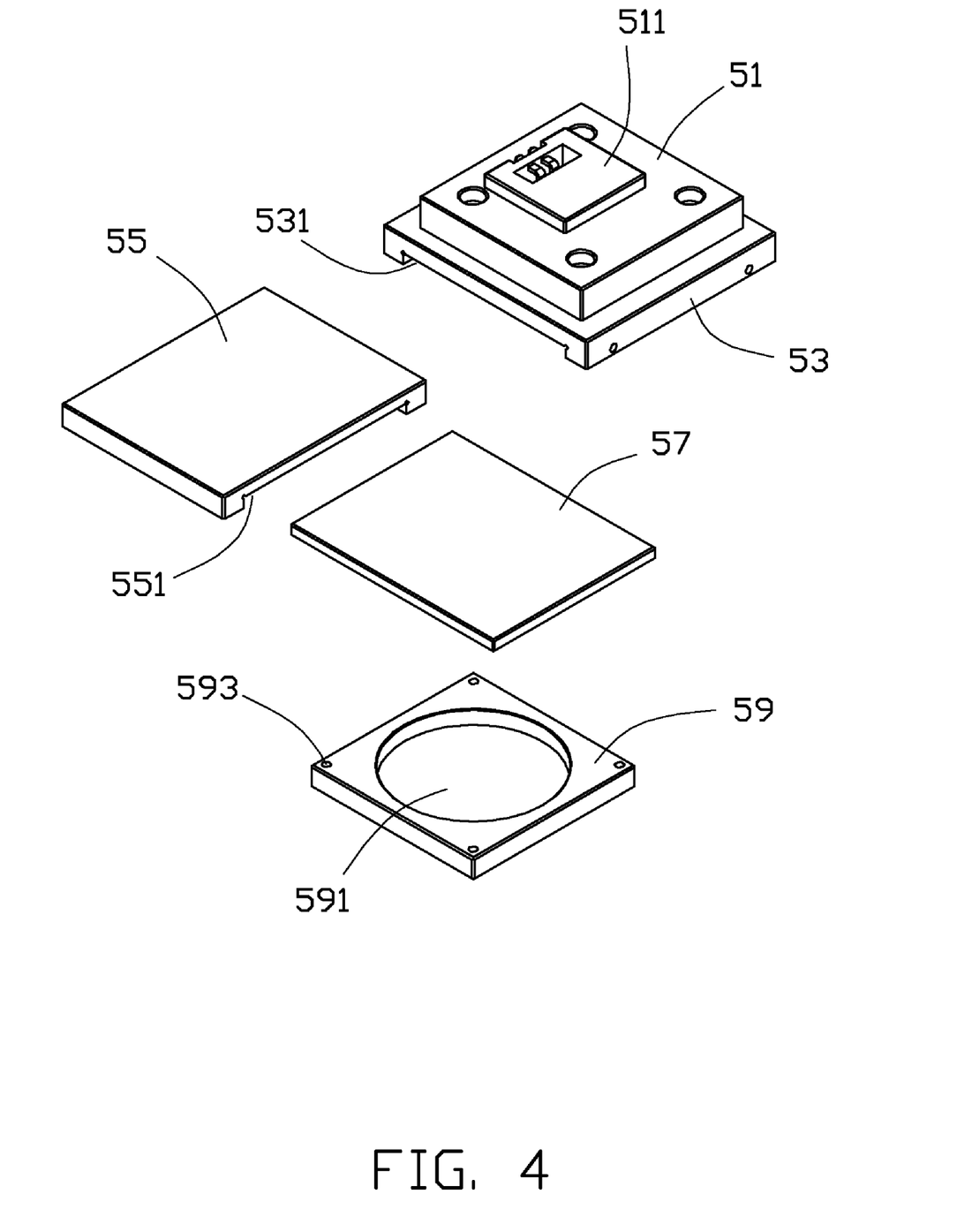
FIG. 4 is an enlarged view of the adjust mechanism shown in FIG. 1.
Figure 5:
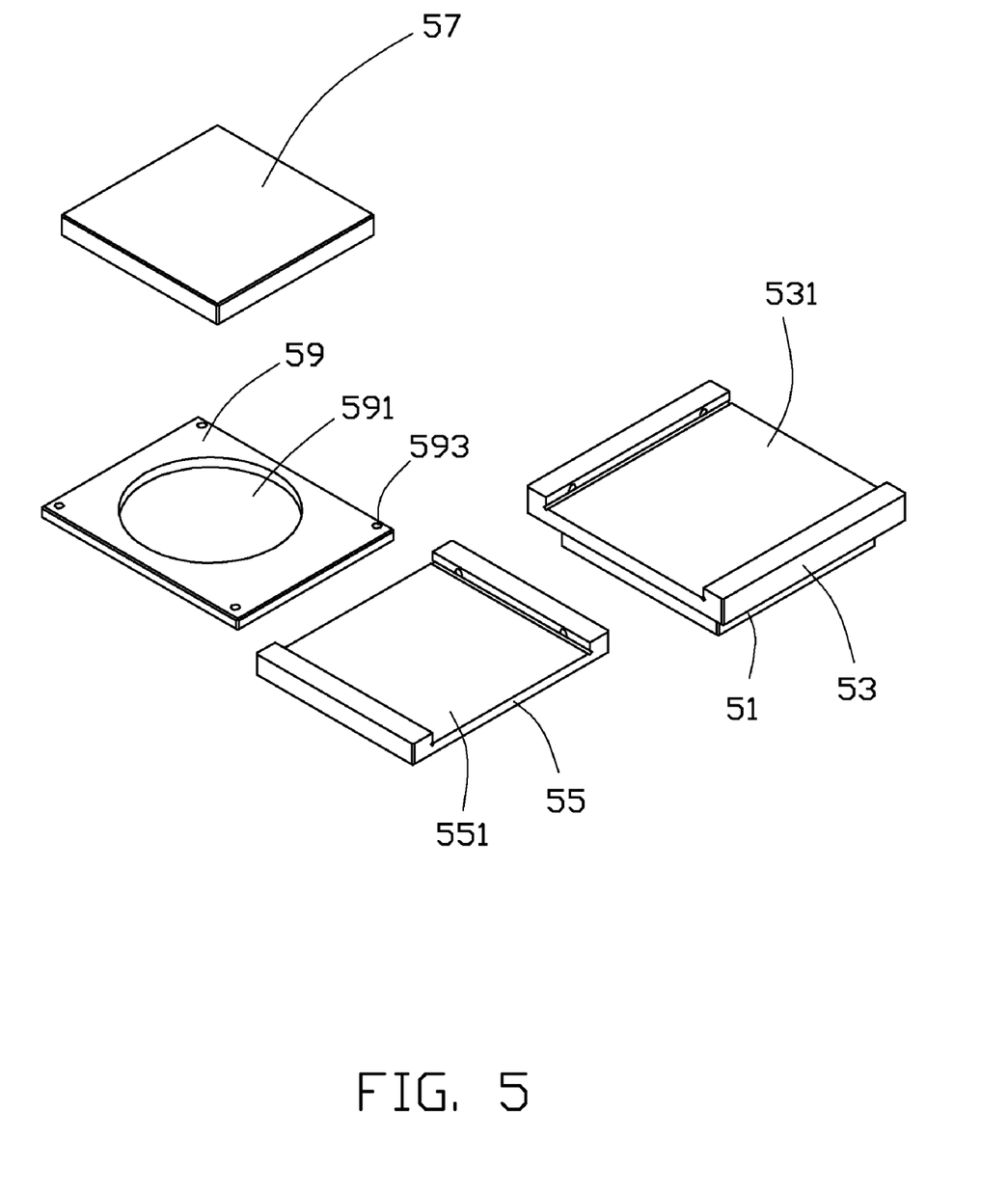
FIG. 5 is similar to FIG. 4, but viewed from another angle.

Referring further to FIGS. 3-5, the adjust mechanism 50 includes a connecting board 51, a first slide board 53, a second slide board 55, a rotate board 57 and a rotate seat 59. The power module 511 is attached to the top surface of the connecting board 51. The power module 511 includes electric terminals 5111. The power module 511 is used to supply electrical power to the portable electronic device. The connecting board 51 defines four screw holes 513 at the four corners. The screw holes 513 facilities a fixing of the connecting board 51 to the first slide board 53. The first slide board 53 defines a first slide groove 531. The second slide board 55 is slidably received in the first slide groove 531. The second slide board 55 defines a second slide groove 551. The rotate board 57 is slidably received in the second slide groove 551. The rotate board 57 has a connecting post 571 protruding therefrom. The rotate seat 59 defines a through receiving cavity 591. The connecting post 571 can be rotatably received into the receiving cavity 591. The rotate seat 59 defines four screw holes 593 at the corners. The screw holes 593 facilities a fixing of the rotate seat 59 to the base board 11.

The drive mechanism 70 includes two slide rails 71, two guide blocks 73, an elastic member 75 and a resist member 77. The slide rails 71 are fixed to the base seat 10. The guide blocks 73 are fixed to the resist member 77. Each guide block 73 defines a guide slit 731. Each slide rail 71 has a guide portion 711 formed corresponding to the respective guiding slit 731. The guide portions 711 can be slidably received into the guiding slits 731, enabling the guide blocks 73 to slidably engage the slide rails 71.

The elastic member 75 is a coil spring. The resist member 77 further has a mounting portion 771 protruding therefrom for receiving one end of the elastic member 75.

Figure 6:
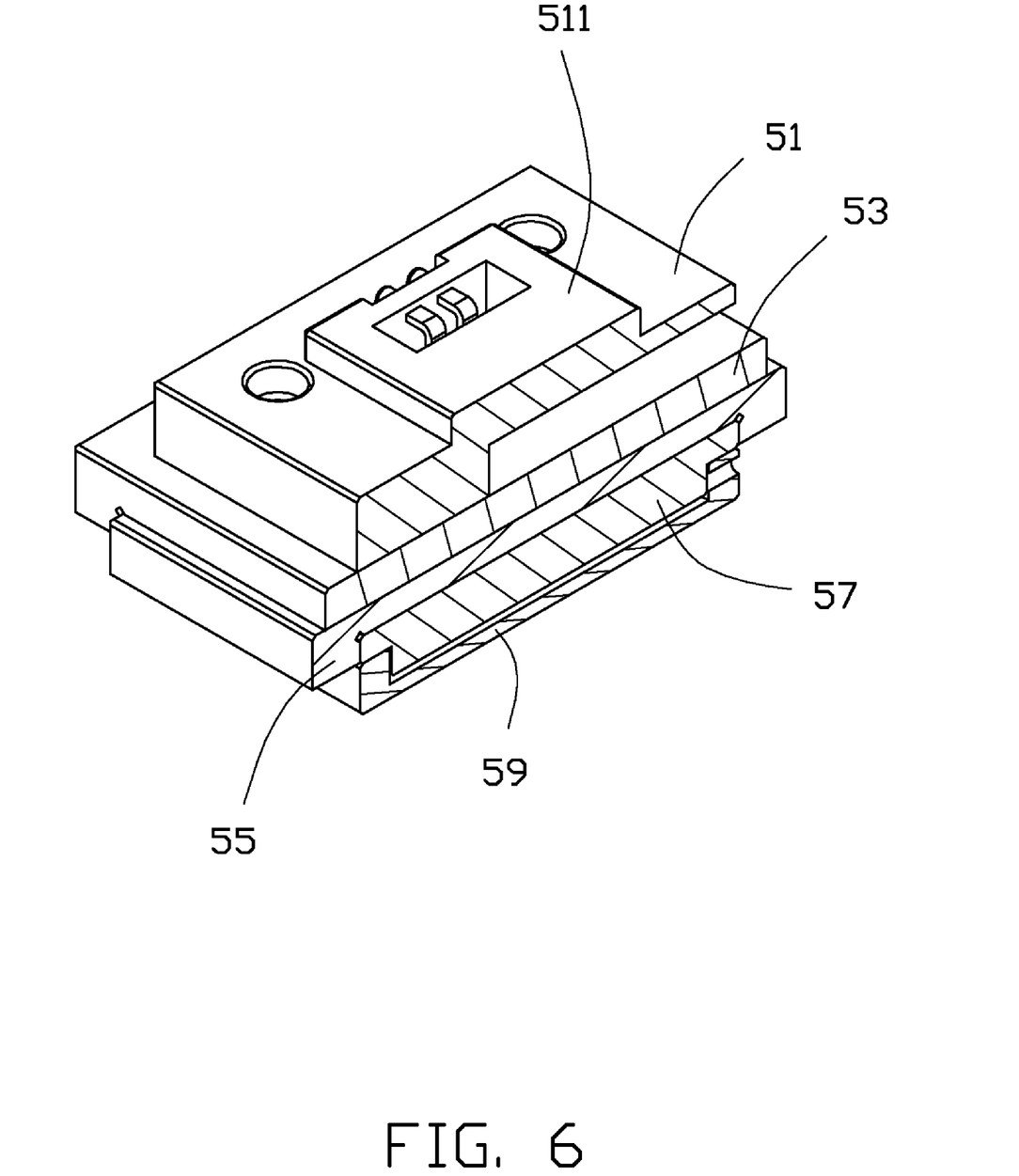
FIG. 6 is a cross section of the adjust mechanism shown in FIG. 3.
Figure 7:
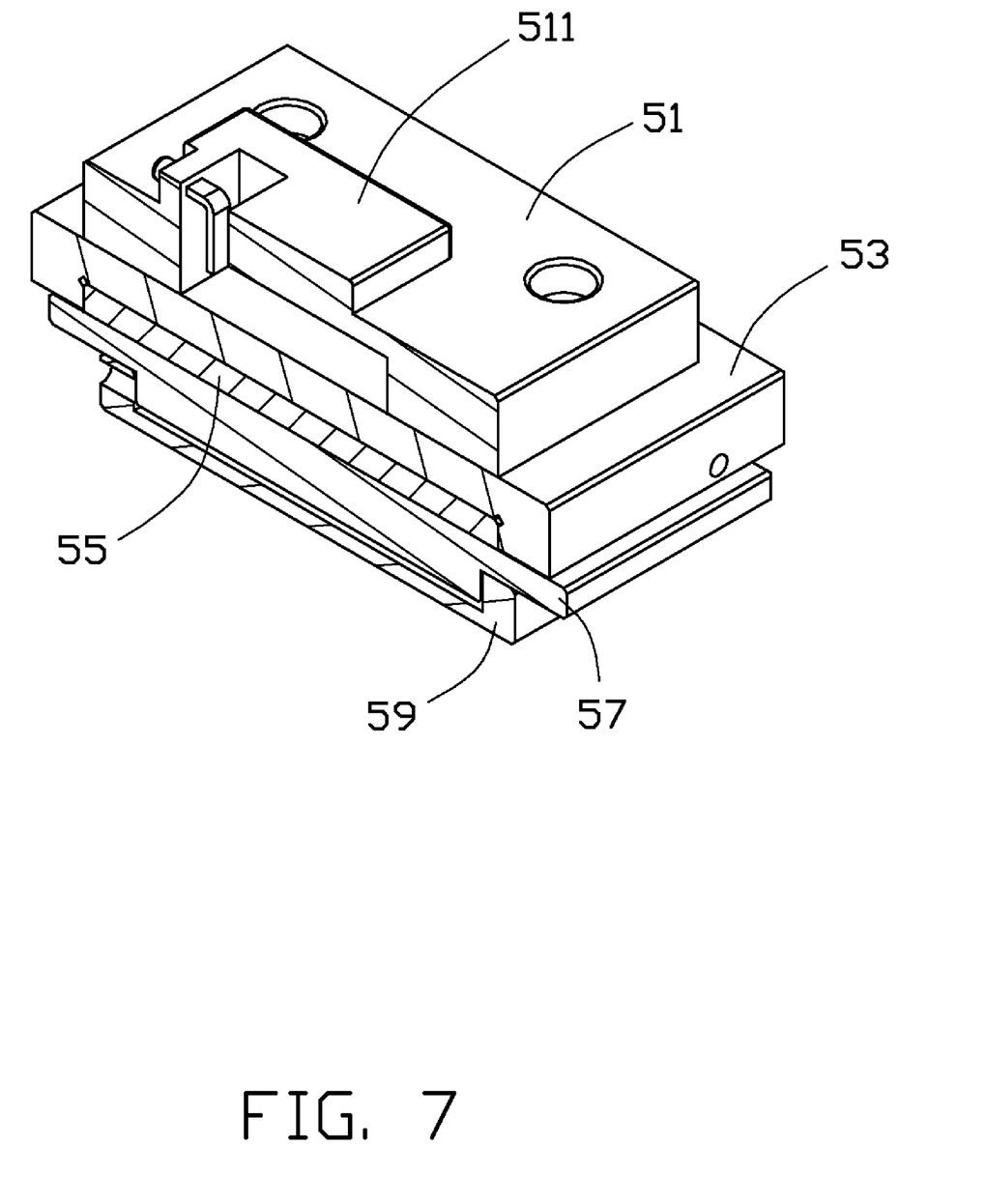
FIG. 7 is similar to FIG. 6, but viewed from another angle.

Referring further to FIGS. 6 and 7, during assembly, the rotate seat 59 is secured to the first surface 111 of the base board 11. The connecting post 571 of the rotate board 57 engages into the receiving cavity 591 of the rotate seat 59. The rotate board 57 is further received in the second slide groove 551 of the second slide board 55. The second slide board 55 is further received in the first slide groove 531 of the first slide board 53. The connecting board 51 is fixed to the first slide board 53. The assembly of the adjust mechanism 50 is finished.

Figure 8:
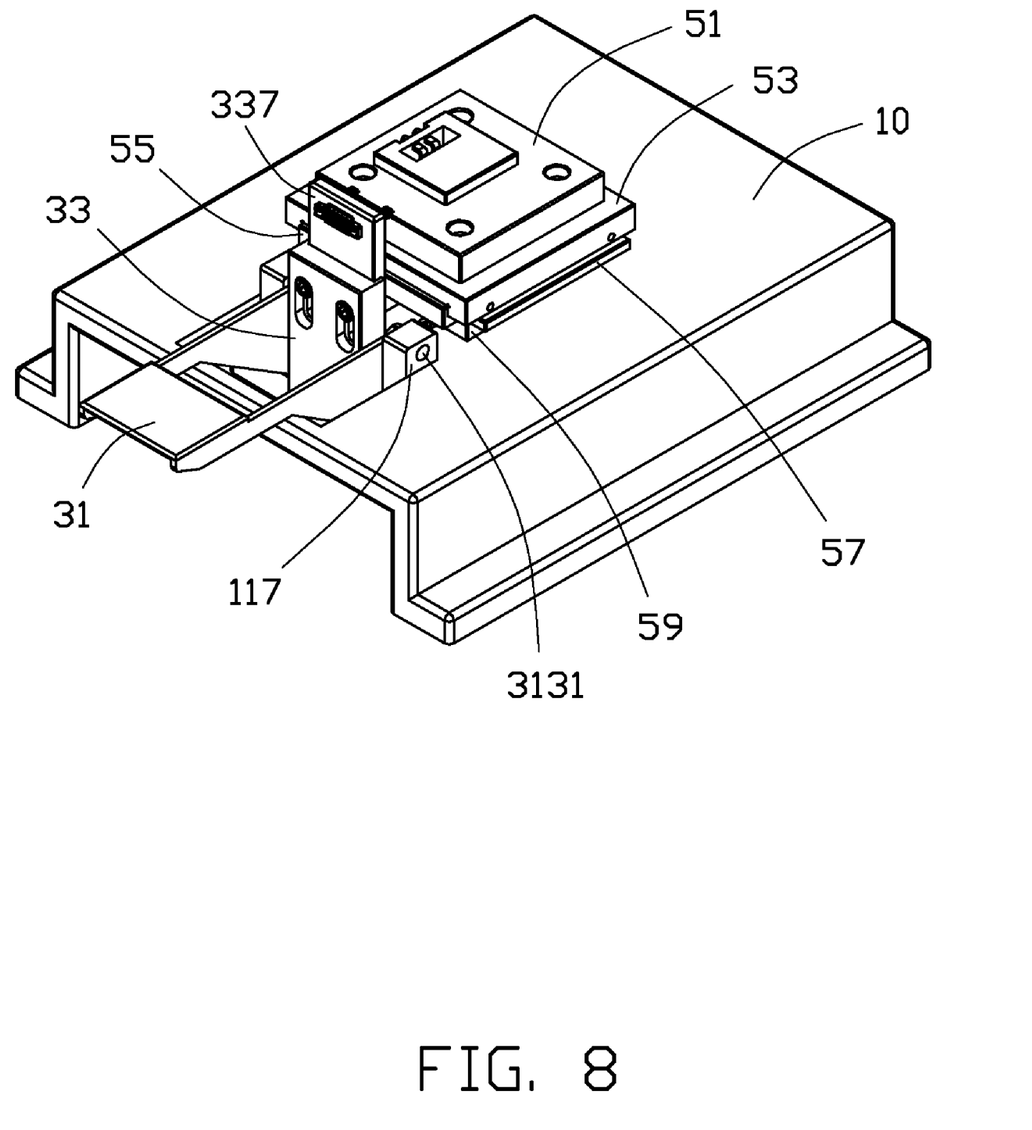
FIG. 8 is an assembled view of the fixture shown in FIG. 1.
Figure 9:
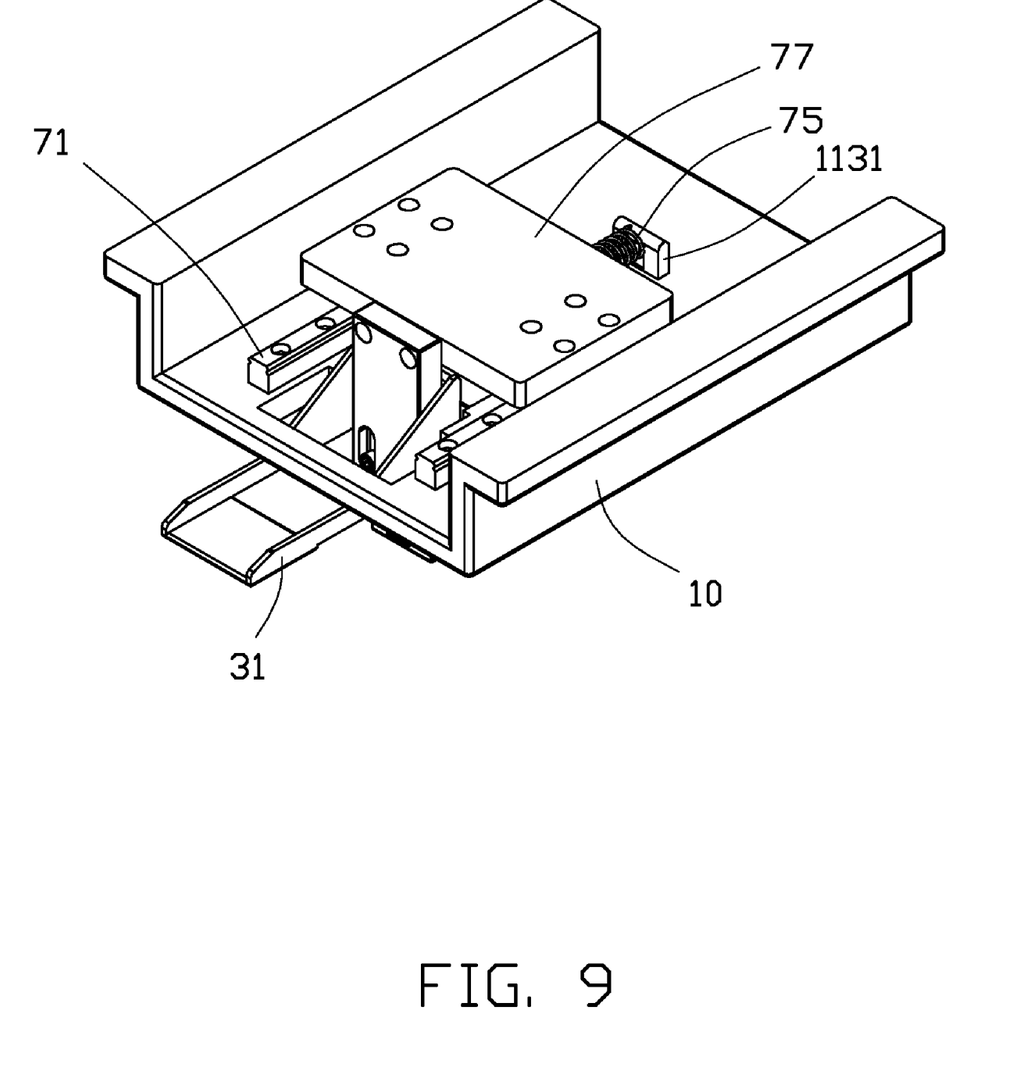
FIG. 9 is similar to FIG. 8, but viewed from another angle.
Figure 10:
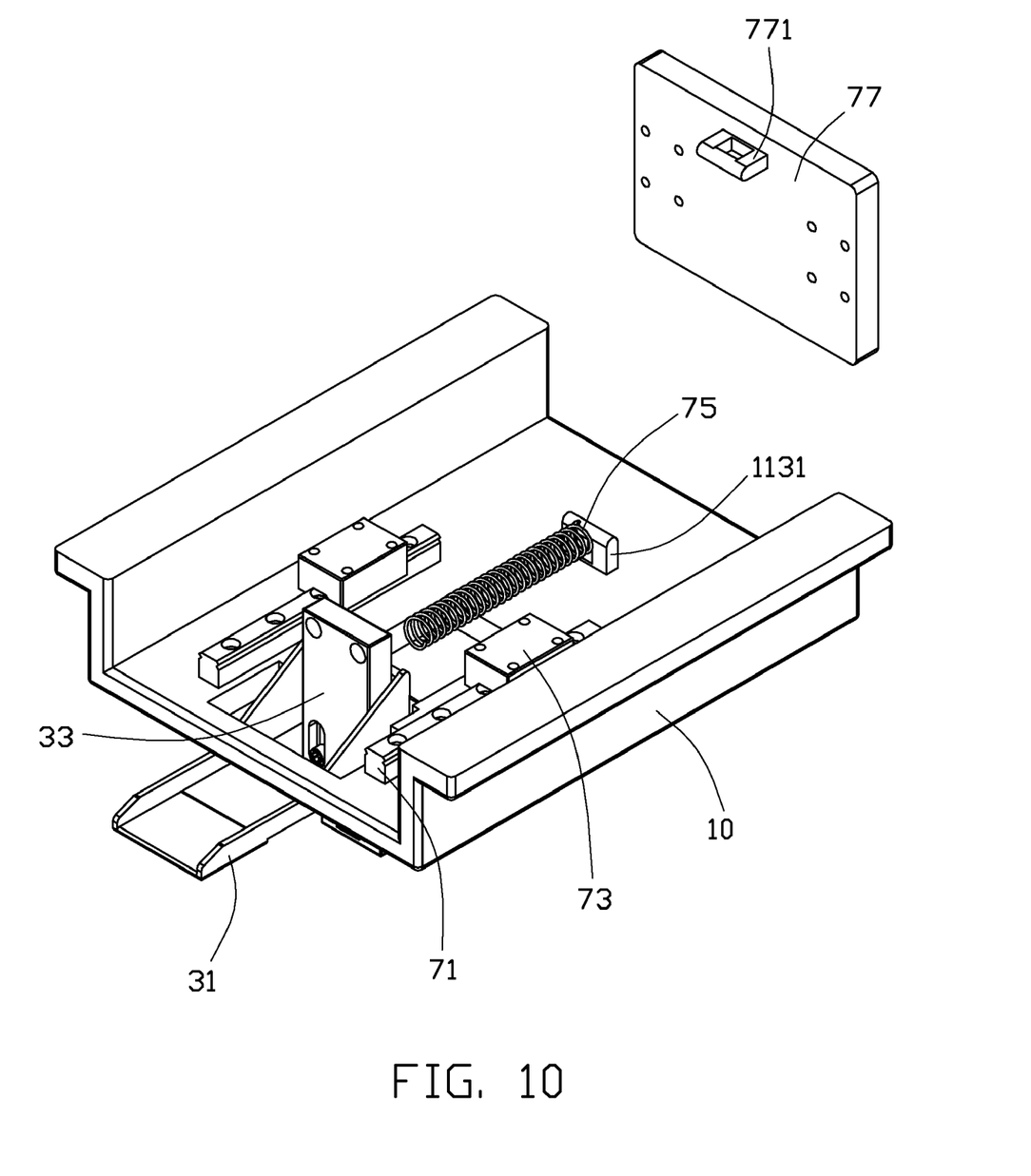
FIG. 10 is similar to FIG. 8, but omitting a resisting board.

Referring further to FIG. 8 through FIG. 10, the two slide rails 71 are fixed to the second surface 113 of the base seat 10. The guide blocks 73 slidably engage with the slide rails 71. The elastic member 75 has one end secured to the mounting portion 771 of the resist member 77, the other end secured to the mounting block 1131 of the base seat 10. The two guide blocks are fixed to the resist member 77. The connecting member 33 is fixed to the resist member 77 of the drive mechanism 70. The handle member 31 is rotatably attached to the position blocks 117 by an engagement of the shaft pins 3131 into the shaft hole 1171. Accordingly, the fixture 100 is assembled. Meanwhile, the elastic member 75 is elastically elongated.

In use, the power module 511 is secured to the connecting board 51 of the adjust mechanism 50. The portable electronic device is secured to the connecting board 51 with the power module 511 electrically fitting into the battery space of the portable electronic device. The connecting member 33 is pulled away from the adjust mechanism 50, and the elastic member 75 is further elongated. During this course, the resist member 77 slides relative to the base seat 10 and the guide blocks 73 slide along the slide rails 71. The connector interface of the portable electronic device can be adjusted to align with the connector 337 by a longitudinal movement of the rotate board 57 relative to the second slide board 55, a longitudinal, orthogonal movement of the second slide board 55 relative to the first slide board 53, and a rotation of the rotate board 57 relative to the rotate seat 59 and the base board 11.

When the connector 337 aligns the connector interface, the connecting member 33 is released and further urged by releasing of the elastic member 75 to move towards and resist the portable electronic device. Meanwhile, the connector 337 mates with the connector interface. The position bar 317 is secured to the position slot 335 by rotating the handle member 31 about the shaft pins 3131. Accordingly, the mating of the connector 337 and the connector interface is securely maintained.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A fixture, comprising:
a base seat;
a resist mechanism fixed to the base seat, the resist mechanism comprising a connector;
a drive mechanism fixed to the base seat; and
an adjust mechanism fixed to the base seat, the adjust mechanism comprising a connecting board, the connecting board having a power module attached thereto, the adjust mechanism configured for adjusting the power module relative to the connector, the drive mechanism configured for driving the connector to move towards the power module.

2. The fixture as claimed in claim 1, wherein the adjust mechanism further comprises a first slide board, a rotate board, and a rotate seat; the connecting board is fixed to the first slide board, the first slide board is slidable relative to the rotate board, the rotate board rotatably engages with the rotate seat, and the rotate seat is fixed to the base seat.

3. The fixture as claimed in claim 2, wherein the adjust mechanism further comprises a second slide board; the first slide board slidably engages the second slide board, the second slide board slidably engages the rotate board; the sliding of the first slide board relative to the second slide board is orthogonal to the sliding of the second slide board and the rotate board.

4. The fixture as claimed in claim 1, wherein the adjust mechanism and the connector are located at the same side of the base seat.

5. The fixture as claimed in claim 1, wherein the resist mechanism comprises a handle member and a connecting member; the handle member is rotatably attached to the base seat and resists the connecting member, and the drive mechanism and the connector are secured to the connecting member.

6. The fixture as claimed in claim 5, wherein:
the handle member comprises two sidewalls, each of the two sidewalls comprises a first end portion and a second end portion opposite to the first end portion;
each of the second end portions comprising a shaft pin;
the base seat comprising two position blocks, each of the position blocks defining a shaft hole;
the shaft pins rotatably engaging into the shaft holes.

7. The fixture as claimed in claim 6, wherein the handle member further comprising a position bar connecting the second end portions; the connecting member defining a position slot, the position bar secured in the position slot.

8. The fixture as claimed in claim 5, wherein the drive mechanism comprises two slide rails and two guide blocks; the slide rails are fixed to the base seat, and the two guide blocks slidably engage the slide rails.

9. The fixture as claimed in claim 8, wherein the drive mechanism further comprises an elastic member and a resist member; the guide blocks secured to the resist member;
the elastic member is elongated and secured between the resist member and the base seat.

10. The fixture as claimed in claim 8, wherein each of the slide rails defining a guide portion, each of the guide blocks defines a guide slit; the guide portions slidably engage into the guide slits.

11. A fixture, comprising:
a base seat;
a resist mechanism fixed to the base seat, the resist mechanism comprising a connector;
a drive mechanism fixed to the base seat; and
an adjust mechanism fixed to the base seat, the adjust mechanism comprising a connecting board, the adjusting mechanism configured for longitudinal moving the connecting board or rotating the connecting board relative to the resist mechanism, the drive mechanism configured for reversely driving a longitudinal movement of the resist mechanism relative to the connecting board.

12. The fixture as claimed in claim 11, wherein the adjust mechanism further comprises a first slide board, a rotate board, and a rotate seat; the connecting board is fixed to the first slide board, the first slide board is slidable relative to the rotate board, the rotate board rotatably engages with the rotate seat, and the rotate seat is fixed to the base seat.

13. The fixture as claimed in claim 12, wherein the adjust mechanism further comprises a second slide board; the first slide board slidably engages the second slide board, the second slide board slidably engages the rotate board; the sliding of the first slide board relative to the second slide board is orthogonal to the sliding of the second slide board and the rotate board.

14. The fixture as claimed in claim 11, wherein the adjust mechanism and the connector are located at the same side of the base seat.

15. The fixture as claimed in claim 11, wherein the resist mechanism comprises a handle member and a connecting member; the handle member is rotatably attached to the base seat and resists the connecting member, and the drive mechanism and the connector are secured to the connecting member.

16. The fixture as claimed in claim 15, wherein:
the handle member comprises two sidewalls, each of the two sidewalls comprises a first end portion and a second end portion opposite to the first end portion;
each of the second end portions comprising a shaft pin;
the base seat comprising two position blocks, each of the position blocks defining a shaft hole;
the shaft pins rotatably engaging into the shaft holes.

17. The fixture as claimed in claim 16, wherein the handle member further comprising a position bar connecting the second end portions; the connecting member defining a position slot, the position bar secured in the position slot.

18. The fixture as claimed in claim 15, wherein the drive mechanism comprises two slide rails and two guide blocks; the slide rails are fixed to the base seat, and the two guide blocks slidably engage the slide rails.

19. The fixture as claimed in claim 18, wherein the drive mechanism further comprises an elastic member and a resist member; the guide blocks secured to the resist member; the elastic member is elongated and secured between the resist member and the base seat.

20. The fixture as claimed in claim 18, wherein each of the slide rails defining a guide portion, each of the guide blocks defines a guide slit; the guide portions slidably engage into the guide slits.

* * * * *